No. 859,124. PATENTED JULY 2, 1907.
H. E. SHORT.
APPARATUS FOR ORNAMENTING CANDY.
APPLICATION FILED DEC. 5, 1906.
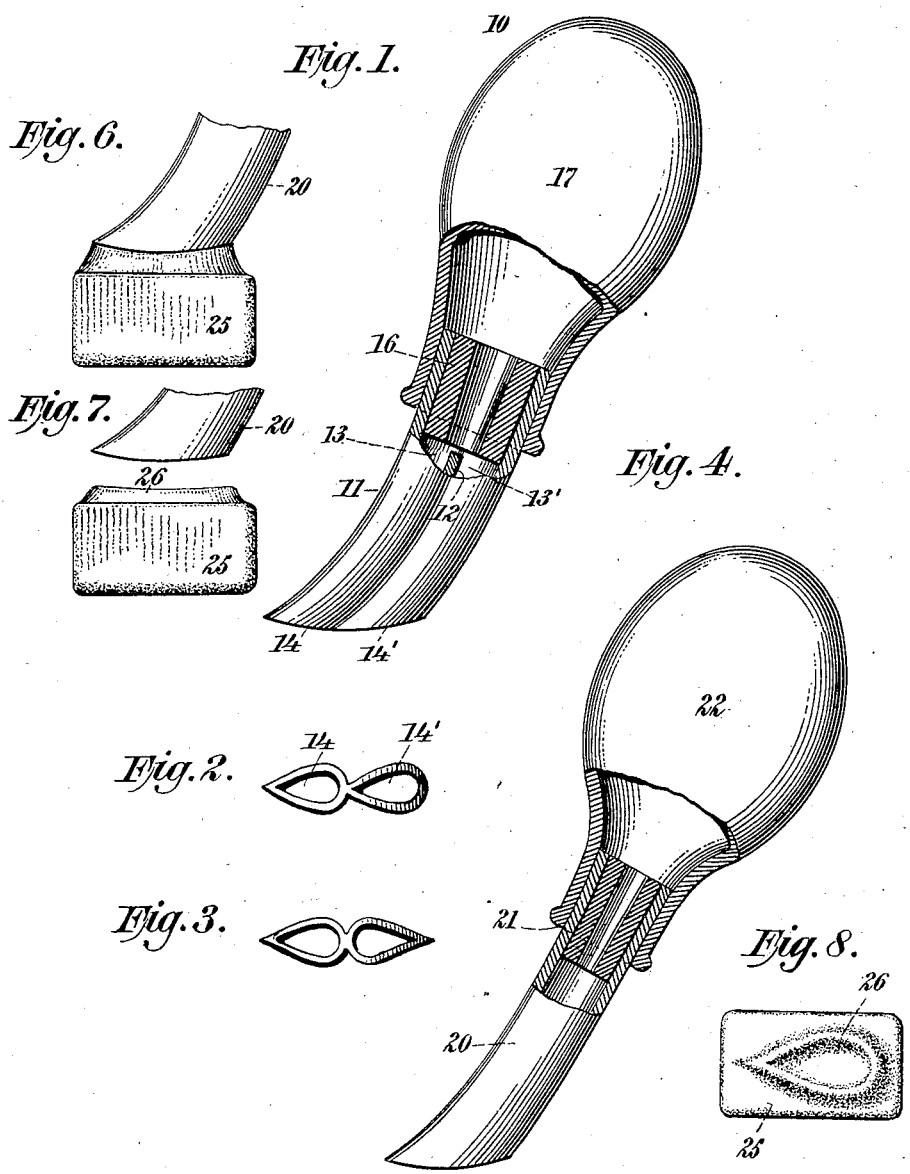
WITNESSES:
Gustave Dieterich
Edwin H. Dieterich
INVENTOR
Henry E. Short
BY Straley & Hasbrouck
his ATTORNEYS

UNITED STATES PATENT OFFICE.

HENRY E. SHORT, OF NEW YORK, N. Y., ASSIGNOR, BY MESNE ASSIGNMENTS, TO EUREKA MANUFACTURING COMPANY, OF BOSTON, MASSACHUSETTS, A CORPORATION OF MASSACHUSETTS.

APPARATUS FOR ORNAMENTING CANDY.

No. 859,124.      Specification of Letters Patent.      Patented July 2, 1907.

Application filed December 5, 1906. Serial No. 346,375.

*To all whom it may concern:*

Be it known that I, HENRY E. SHORT, a citizen of the United States, residing at the city of New York, borough of Manhattan, in the county and State of New York, have invented certain new and useful Improvements in Apparatus for Ornamenting Candy, of which the following is a full, clear, and exact specification.

My invention relates to improvements in means for ornamenting or decorating candy, confectionery and analogous substances, and the same has for its object more particularly to provide a simple, efficient and reliable apparatus for ornamenting candy coated with chocolate or analogous material.

Further said invention has for its object to provide an apparatus by means of which ornaments of different design may be produced.

Further said invention has for its object to provide an apparatus in which the ornamenting nozzle may be easily released from the coating or icing in such manner as not to destroy or impair the design produced.

To the attainment of the aforesaid objects and ends my invention consists in the novel details of construction, and in the combination, connection and arrangement of parts hereinafter more fully described and then pointed out in the claims.

In the accompanying drawings forming part of this specification wherein like numerals of reference indicate like parts, Figure 1 is a side view, partly broken away, showing an apparatus constructed according to and embodying my said invention; Fig. 2 is a detail bottom view of the ornamenting nozzle shown in side view at Fig. 1; Fig. 3 is a similar view showing a slightly changed form of nozzle; Fig. 4 is a view similar to Fig. 1, showing a single ornamenting nozzle; Fig. 5 is a detail bottom view of the nozzle seen in side view at Fig. 4; Fig. 6 is a side view of a piece of coated candy showing the lower end of an ornamenting nozzle as the same appears producing a design, and just prior to its disengagement from the coating; Fig. 7 is a similar view with the nozzle just released of its engagement with the coating, and Fig. 8 is a plan or top view showing a complete piece of ornamented candy.

In said drawings 10 designates an apparatus for ornamenting cake, candy and other confections consisting of a curved, flexible nozzle 11 formed preferably of rubber and provided with a centrally arranged longitudinal partition 12 which divides said nozzle 11 into two separate compartments 13, 13′ having separate discharge ends 14, 14′ respectively. The lower edge of the nozzle 11 is preferably slightly curved, as shown in Fig. 1, and shaped to the particular form of design desired. Within the upper end of the nozzle 11, above the partition 12 therein is secured a reinforcing sleeve member 16, and 17 denotes a compressible bulb made of rubber or other suitable material which is provided at its lower end with an aperture to receive the upper reinforced end of the nozzle 11 and hold the same by frictional engagement therein.

In the modification illustrated at Figs. 4 and 5, the apparatus is essentially as above described, except that in the construction here illustrated the nozzle 20 is a single one and of uniform diameter throughout, and the sleeve 21 secured within its upper end conforms in diameter thereto. The bulb 22 is applied to the nozzle 20 in the manner above described.

The operation of the apparatus is as follows: Assuming the piece of candy 25 to be ornamented has just been dipped into the coating material, for example, chocolate, and that the surplus coating has been shaken off, the apparatus is then applied to the candy and the lower curved edge of the nozzle 20 brought into contact with the upper surface of the coated candy. As soon as the edge of the nozzle contacts with the soft chocolate coating the latter will adhere to said nozzle. The apparatus is then slightly raised, as shown in Fig. 1, and the coating drawn up therewith a short distance, whereupon the bulb 22 is compressed and the connection between the coating and the lower edge of the nozzle broken. The nozzle may then be removed, whereupon the coating will again settle slightly upon the piece of candy 25 and form a raised ornament as 26 conforming in outline with the shape or design of the discharge end of the particular type of nozzle used. It will be obvious that the discharge end of the nozzle may be made in a large variety of shapes and combinations.

Having thus described my invention, what I claim and desire to secure by Letters Patent is:

1. An apparatus of the character described, comprising a nozzle having a discharge end adapted to adhere to a coating material, and means for releasing said discharge end from said coating material, substantially as specified.

2. An apparatus of the character described, comprising a flexible nozzle having a discharge end adapted to adhere to a coating material, and means for releasing said discharge end from said coating material, substantially as specified.

3. An apparatus of the character described, comprising a nozzle having a discharge end provided with a flat edge adapted to adhere to a coating material, and means for releasing said discharge end from said coating material, substantially as specified.

4. An apparatus of the character described, comprising a flexible nozzle having a discharge end provided with a flat edge adapted to adhere to a coating material, and means for releasing said nozzle from said coating material, substantially as specified.

5. An apparatus of the character described, comprising a flexible, tubular nozzle having a discharge end provided with a flat edge adapted to adhere to a coating material, and means for releasing said nozzle from said coating material, substantially as specified.

6. An apparatus of the character described, comprising a flexible, tubular nozzle having a discharge end provided with a flat edge adapted to adhere to a coating material, and a compressible handle secured to and communicating with said nozzle, substantially as specified.

7. An apparatus of the character described, comprising a flexible, tubular nozzle having a discharge end provided with a flat edge adapted to adhere to a coating material, and a compressible bulb secured to and communicating with said nozzle, for releasing said nozzle from said coating, substantially as described.

8. An apparatus of the character described, comprising a flexible, tubular nozzle having a discharge end provided with a flat edge adapted to adhere to a coating material, a reinforcement arranged in its upper end, and a compressible bulb secured to said reinforced end, substantially as specified.

9. An apparatus of the character described, comprising a flexible, tubular nozzle having a discharge end of ornamental outline provided with a flat edge adapted to adhere to a coating material, a sleeve section secured in the upper end of said nozzle, and a compressible bulb secured to the upper end of said nozzle, substantially as specified.

10. An apparatus of the character described, comprising a flexible, tubular nozzle terminating in a plurality of discharge ends having flat edges adapted to adhere to a coating material, and means for releasing said nozzle from said coating material, substantially as specified.

11. An apparatus of the character described, comprising a flexible tubular nozzle having a plurality of longitudinal compartments therein, each terminating in a discharge end having a flat edge adapted to adhere to a coating material, and a compressible bulb secured to said nozzle, substantially as specified.

12. An apparatus of the character described, comprising a flexible, tubular nozzle having a longitudinal partition therein and terminating in a plurality of discharge ends having flat edges adapted to adhere to a coating material, and a compressible bulb secured to the upper end of said nozzle, substantially as specified.

13. An apparatus of the character described, comprising a flexible nozzle having a longitudinal partition therein, said nozzle having its lower end inclined and provided with a plurality of discharge ends having flat edges adapted to adhere to a coating material, a tubular reinforcement secured in the upper end of said nozzle, and a compressible bulb secured to the upper reinforced end of said nozzle, substantially as specified.

Signed at the city of New York, in the county and State of New York, this first day of December, nineteen hundred and six.

HENRY E. SHORT.

Witnesses:
CONRAD A. DUTEN, Jr.,
A. R. ANGUS.